(12) United States Patent
Tokuyoshi

(10) Patent No.: US 6,487,408 B1
(45) Date of Patent: *Nov. 26, 2002

(54) MOBILE COMMUNICATION SYSTEM AND METHOD FOR REGISTERING LOCATION OF A MOBILE TERMINAL IN THE MOBILE COMMUNICATION SYSTEM

(75) Inventor: Takaya Tokuyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/379,512

(22) Filed: Aug. 23, 1999

Related U.S. Application Data

(63) Continuation of application No. 08/572,724, filed on Dec. 14, 1995.

(30) Foreign Application Priority Data

Dec. 15, 1994 (JP) ................................. 6-332921

(51) Int. Cl.$^7$ .......................... H04Q 7/20; H04Q 7/00
(52) U.S. Cl. ................. 455/435; 455/433; 455/454; 370/333
(58) Field of Search ................. 455/435, 433, 455/454; 370/333

(56) References Cited

U.S. PATENT DOCUMENTS

| 5,095,531 A | 3/1992 | Ito |
| 5,371,780 A | 12/1994 | Amitay |
| 5,408,466 A | 4/1995 | Ablay |
| 5,432,841 A | 7/1995 | Rimer |
| 5,483,669 A | * 1/1996 | Barnett et al. |
| 5,509,052 A | 4/1996 | Chia et al. |
| 5,513,246 A | * 4/1996 | Jonsson et al. |
| 5,649,289 A | * 7/1997 | Wang et al. ................. 455/433 |
| 5,669,061 A | 9/1997 | Schipper |
| 5,862,487 A | * 1/1999 | Fujii et al. .................. 455/454 |
| 6,058,310 A | * 5/2000 | Tokuyoshi .................. 455/435 |
| 6,108,322 A | * 8/2000 | Kotzin et al. ............... 370/333 |

FOREIGN PATENT DOCUMENTS

| EP | 0 210 792 | | 2/1987 |
| EP | 0719063a1 | * | 6/1996 |
| JP | 64 712 226 | | 3/1989 |
| WO | WO096/23371 | * | 8/1996 |

* cited by examiner

*Primary Examiner*—William Cumming
(74) *Attorney, Agent, or Firm*—Sughrue Mion, PLLC

(57) ABSTRACT

A mobile terminal registration system is provided for a mobile communication system having a plurality of base stations making respective radio zones and a mobile terminal that moves in the radio zone and registers its location to the base stations. The mobile terminal comprises a location registration section for detecting reception levels of signals from the base stations, calculating a difference of the largest reception level and the second reception level and registering the mobile terminal location to a base station that transmits the largest reception level signal if the difference is larger than a threshold value.

3 Claims, 6 Drawing Sheets

MOBILE COMMUNICATION SYSTEM AND METHOD FOR REGISTERING LOCATION OF A MOBILE TERMINAL IN THE MOBILE COMMUNICATION SYSTEM

This is a Continuation of application Ser. No. 08/572,724, filed Dec. 14, 1995.

BACKGROUND OF THE INVENTION

This invention relates to an system and method for registering location of a mobile terminal in a mobile communication system, more particularly, to an system and method for making an exchange office recognize a radio zone where the mobile terminal exists to control communication.

Conventionally, methods for making an exchange office control location of a mobile terminal that moves in a plurality of radio zones made up by a plurality of base stations are proposed, for example, one of them is disclosed in Japanese Patent Laid Open No. 71226 (1989).

In this method, a location display unit provided in an exchange office receives location information of a mobile terminal as well as a mobile terminal number and displays the location information of a mobile terminal. Then, location of the mobile terminal is recognized and controlled.

In this conventional location control method, as shown in FIG. 6 for example, a plurality of base stations B1 to B3 are connected with an exchange office A. The base stations make radio zones Z1 to Z3, respectively. A mobile terminal receives one or more control signals from the base stations. If there are multiple control signals, the mobile terminal C registers its location to a base station having transmitted a control signal of which reception level is largest. According to this location registration, the exchange office. A acquires location information of the mobile terminal via a base station having been registered the location. The location information acquired is displayed on the location display unit provided in the exchange office A.

In such a conventional method, when the mobile terminal moves to an area of a base station to which the mobile terminal registers its location overlapped with a neighboring radio zone from an area not overlapped with the neighboring radio zone, if a reception level of signal from the base station having been registered the location is more than a preset level, the mobile terminal does not register its location to the base station of the neighboring radio zone even if the reception level of signal from the neighboring base station is larger than the reception level of signal from the base station to which the mobile terminal registers its location. Therefore, the exchange office A can not recognize that the mobile terminal C has moved to the radio zone of neighboring base station.

To solve this problem, the mobile terminal compares reception levels from a plurality of base stations and register its location to a base station that transmits a signal of largest reception level in the area where radio zones overlap. In this method, the mobile terminal can register its location to the nearest base station, so the exchange office can properly control location of the mobile terminal.

However, in this method, if the mobile terminal is in an area where reception levels from neighboring base stations are nearly equal, the moving mobile terminal may frequently change the base station to be registered location. As a result, it may occur confusion on location control of the mobile terminal.

SUMMARY OF THE INVENTION

It is an object of the present invention to solve the aforementioned problems.

It is another object of the present invention to provide a mobile communication system enabling to properly and immediately control location registration of a mobile terminal in an exchange office.

It is still another object of the present invention to provide a method for registering location of a mobile terminal wherein an exchange office can immediately confirm location of a mobile terminal and properly conduct location control of the mobile terminal.

The object of the present invention is achieved by a mobile communication system having a plurality of base stations, each of the base stations makes a radio zone, and a mobile terminal that moves in the radio zones and registers location of the mobile terminal to a predetermined base station, wherein the mobile terminal comprises location registration means for detecting reception levels of signals from the base stations, calculating a difference between a largest reception level and a second largest reception level and registering location of the mobile terminal to a base station having transmitted a signal of the largest reception level when the difference is larger than a preset threshold value.

The object of the present invention is further achieved by a method for registering location of a mobile terminal in a mobile communication system having a plurality of base stations, each of the base stations makes a radio zone, and a mobile terminal that moves in a plurality of radio zones, in the mobile terminal, comprising steps of:

detecting a plurality of reception levels of a plurality of signals from the base stations;

selecting a largest reception level and a second largest reception level from among detected reception levels;

calculating a difference between the largest reception level and the second largest reception level; and registering location of the mobile terminal to a base station having transmitted a signal of the largest reception level when the difference is lager than a preset threshold value.

In the present invention, changes of location registration are not conducted in an area where reception levels of signals from neighboring base stations are nearly equal and a change of location registration is conducted when a difference of reception levels of signals becomes lager than a preset threshold value as the mobile terminal moves. So the frequency of changing location registration becomes low and confusion of location control in the exchange office becomes avoidable.

Furthermore, the exchange office comprises a location display unit for displaying location of the mobile terminal. The location display unit has a map indicating divisions of the base stations and displays location of the mobile terminal in a division of the base station according to a signal from a base station having been registered location of the mobile terminal. As a result, location of the mobile terminal can be confirmed immediately.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

A first embodiment of the present invention is described.

In the first embodiment, two radio zones partially overlap each other.

Figure 1:
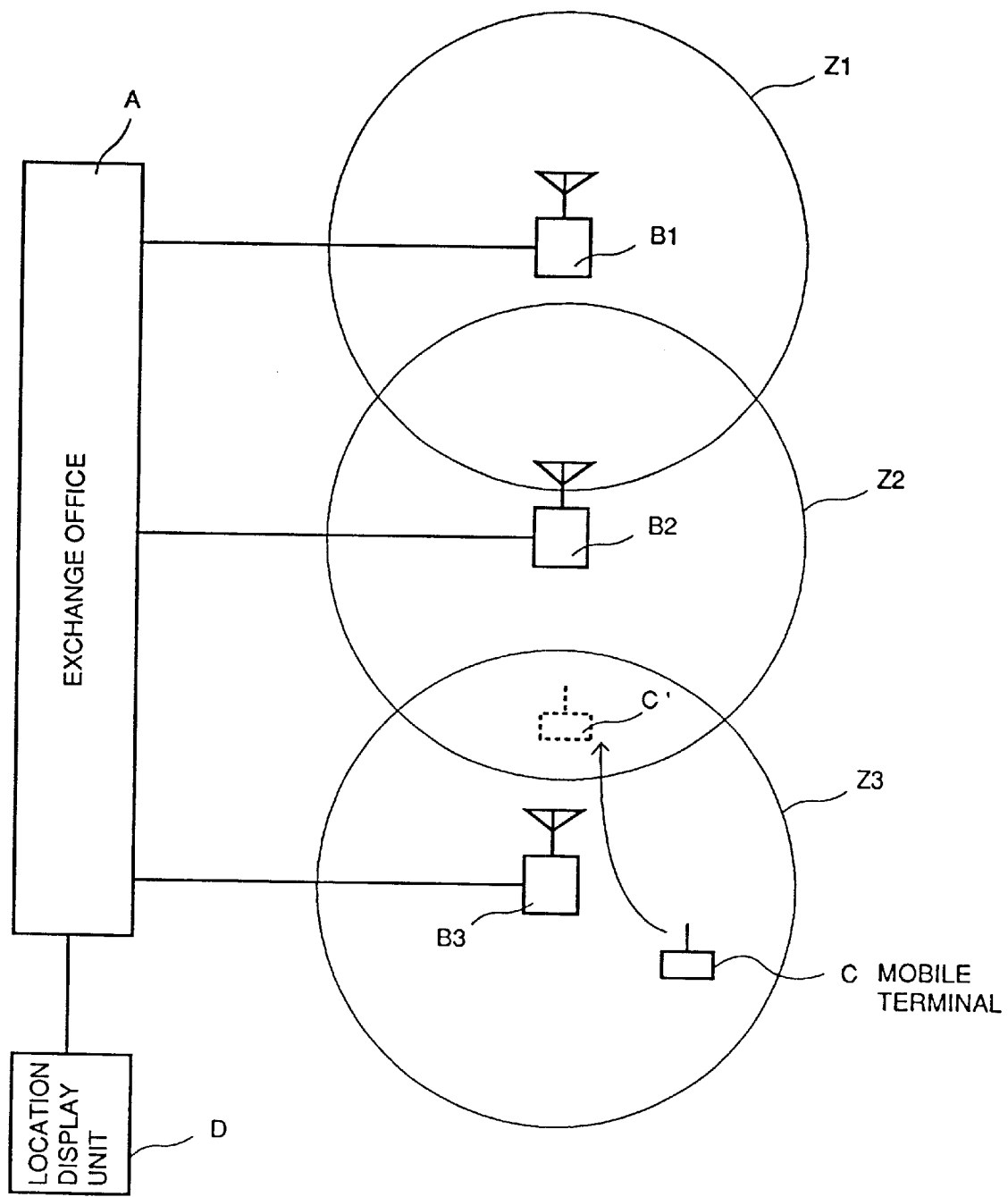
FIG. 1 illustrates a system configuration of a first embodiment.

FIG. 1 illustrates a system configuration to explain the first embodiment of the present invention.

In this system, a plurality of base stations B1 to B3 make radio zones Z1 to Z3, respectively. radio zones of neighboring base stations partially overlap each other.

The base stations B1 to B3 are connected to an exchange office A, respectively. The base stations B1 to B3 can transmit/receive a signal to/from the exchange office A.

The exchange office A has a location display unit D. The location display unit D has a map where location of the base stations B1 to B3 is registered and a mobile terminal C is displayed on the map according to the base station having been registered location of the mobile terminal. When the mobile terminal C currently registers its location to the base station B3, for example, the mobile terminal C is displayed in the division of the base station B3 on the location display unit D. Then, the exchange office A can confirm existence of the mobile terminal C as it is in the vicinity of the location of the base station B3. According to this data, the exchange office A can conduct location control of the mobile terminal C.

Next, a signal used for the embodiment is described. A signal format used for the embodiment is the same as that of Personal Handy-phone System (referred to as PHS, hereinafter)

Figure 2:
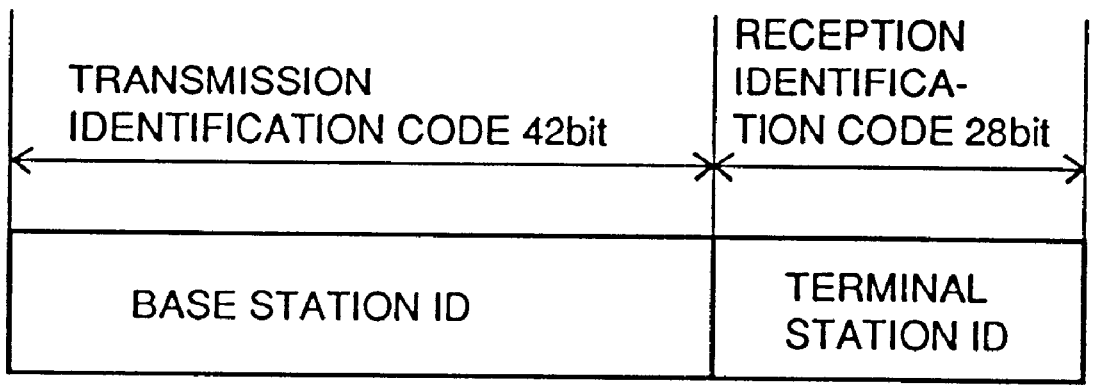
FIG. 2 is a figure for explaining a signal format.

In PHS, a TDMA frame is used for a transmission/reception signal. A TDMA frame has four slots for transmission and reception, respectively. The signal format of each slot has a transmission identification code and a reception identification code as shown in FIG. 2. In the present embodiment, the mobile terminal C identifies the transmitter of a reception signal using the transmission identification code. The above signal format is describes in detail in "PERSONAL HANDY PHONE SYSTEM RCR STANDARD VERSION 1, RCR STD-28" issued by Research & Development Center for Radio System (RCR) on Dec. 20, 1993.

Next, the concrete configuration of the mobile terminal C is described.

Figure 3:
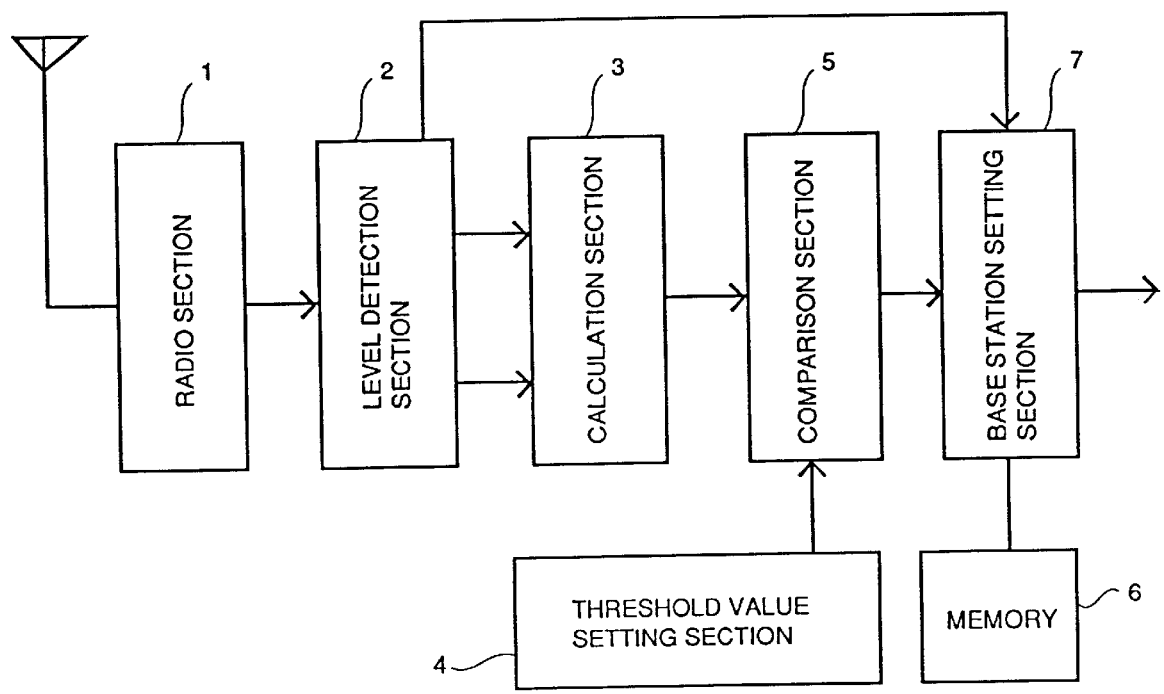
FIG. 3 is a block diagram of a mobile terminal.

FIG. 3 is a block diagram of the mobile terminal C.

In FIG. 3, the numeral 1 is a radio section for receiving signals from the base stations B1 to B3.

The numeral 2 is a level detection section for detecting a reception level of a received signal. It identifies each transmitter of a reception signal based on a transmission identification code included in the reception signal if two reception signals have been input. Also, it generates identification information indicating a transmitter of the signal based on the transmission identification code included in a reception signal of which reception level is larger than the others and outputs it to a base station setting section 7 described later.

The numeral 3 is a calculation section. It calculates an absolute value of a difference of reception levels of two signals output from the level detection section 2.

The numeral 4 is a threshold value setting section, wherein a threshold value is preset in advance.

The numeral 5 is comparison section. It compares a reception level difference output from the calculation section 3 and the preset threshold value in the threshold value setting section 4 and outputs a location registration requirement signal when the reception level difference is larger than the threshold value.

The numeral 6 is a memory for storing an identifier of a base station to which the mobile terminal C currently registers its location.

The numeral 7 is a base station setting section. When the location registration requirement signal is input, the base station setting section 7 compares a base station indicated by an identifier stored in the memory 6 and a base station indicated by identification information output from the level detection section 2. When the base station indicated by the identifier and the base station indicated by the identification information are different each other, the base station setting section 7 registers location to the base station indicated by the identification information and updates the content of the memory 6 by an identifier of the base station to which it newly has registered location. While, when a base station indicated by an identifier and a base station indicated by identification information is the same each other, location registration is not conducted.

Next, operations of the first embodiment are. described.

Here, a threshold value set in the threshold value level setting section 4 is 5 dB in the following explanations.

[Case-1]

The mobile terminal C is in the zone Z3 of the base station B3. (In this case, the mobile terminal C is shown by a solid line in FIG. 1)

Here, the case that the mobile terminal C is in the zone Z3 of the base station B3, the mobile terminal C can receive a signal from the base station B3 but can not receive a signal from the base station B2 is explained. Where, the mobile terminal C had registered its location to the base station B3.

First, the mobile terminal C receives the signal from the base station B3 with the radio section 1.

The level detection section 2 detects a reception level of signal from the base station B3 and outputs a result to the calculation section 3. The reception level at this time is assumed as 7 dB.

In Case-1, the mobile terminal C can not receive other than the signal from the base station B3, so there is no signal to be detected. Then, the level detection section 2 generates identification information indicating the base station B3 according to a transmission identification code included in the reception signal, and outputs the identification information to the base station setting section 7.

The calculation section 3 calculates a reception level difference. In this case, the detected reception level is only 7 dB, so the reception level difference is also 7 dB.

The comparison section 5 compares the reception level difference 7 dB and the threshold value 5 dB. In this case, the reception level difference is larger than the threshold value. Therefore, the comparison section 5 outputs a location registration requirement signal.

When receiving the location registration requirement signal, the base station setting section 7 compares a base station indicated an identifier stored in the memory 6 and a base station indicated by identification information. Here, the base station indicated by the identifier stored in the memory 6 is the base station B3, the base station indicated by the identification information is also the base station B3. Therefore, two base stations are the same, so the base station setting section 7 does not register the location to the base station B3 again.

[Case-2]

The mobile terminal C is in an area where the zone Z3 of the base station B3 and the zone Z2 of the base station B2 partially overlap. (In this case, the mobile terminal C' is shown by a broken line in FIG. 1)

Here, the case that the mobile terminal C moves to the radio zone Z2 of the neighboring base station B2 from the radio zone Z3 of the base station B3 and it reaches to the area where both radio zones overlap is explained.

Figure 4:
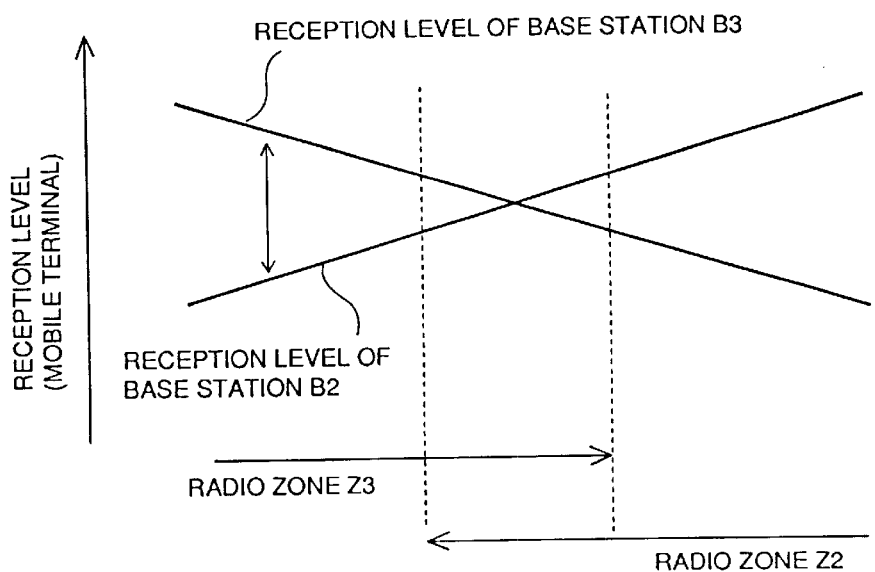
FIG. 4 is a figure showing a typical status of reception levels of signals.

At this time, the mobile terminal C receives a signal from the base station B3 having been registered location by the mobile terminal C and a signal from the base station B2. FIG. 4 typically shows a status of reception level.

The level detection section 2 respectively detects reception levels of signals from the base stations B2 and B3. If assuming that the reception level of the signal from the base station B2 is 2 dB and that from the base station B3 is 5 dB, the level detection section 2 generates identification information B3 indicating the base station B3.

Next, the calculation section 3 calculates a difference between both reception levels. In this case, the reception level difference is 3 dB.

The comparison section 5 compares the reception level difference 3 dB and the threshold value 5 dB. Here, the threshold value is larger than the reception level difference. Therefore, location registration requirement signal is not output.

The base station setting section 7 does not receive the location registration requirement signal, it does not register the location.

As the mobile terminal C moves nearer to the base station B2, the reception level of the signal from the neighboring base station B2 becomes larger, so the difference of reception levels of signals from both base stations gradually becomes small, finally it becomes zero when both reception levels of signals become the same. Therefore, the value, level difference, output from the calculation section 3 becomes smaller than the threshold value level. In this case, described as above, the comparison section 5 does not output the location registration requirement signal to the base station setting section 7, so the registered location is kept as it is.

When the mobile terminal C moves to the side nearer to the base station B2 than the base station B3, the reception level of signal from the base station B2 is larger than that from the base station B3.

Here, it is assumed that the level detection section 2 detects 2 dB reception level of signal from the base station B3 and 8 dB reception level of signal from the base station B2. Then, the level detection section 2 generates identification information indicating B2, because the reception level of signal from the base station B2 is larger.

The calculation section 3 calculates a difference of reception levels of both signals. In this case, the reception level difference is 6 dB.

The comparison section 5 compares the reception level difference 6 dB and the threshold value 5 dB. In this case the reception level difference is larger than the threshold value. Therefore, a location registration setting requirement signal is output.

When receiving the location registration setting requirement signal, the base station setting section 7 compares a base station indicated by an identifier stored in the memory 6 and a base station indicated by identification information. In this case, the base station stored in the memory 6 is the base station B3 and the base station indicated by the identification information is the base station B2. Therefore, two base stations are not the same, so the base station setting section 7 registers the location to the base station B2.

As a result of this location registration, the mobile terminal is displayed in the division of the base station B2 on the map of the location display unit D in the exchange office, so the exchange office can confirm that the mobile terminal C is near the base station B2.

Like this, when the mobile terminal C moves from a radio zone from which the mobile terminal C is receiving a signal of reception level larger than a preset reception level to another neighboring radio zone via an area where both radio zones overlap, a base station to be registered location of the mobile terminal C can be automatically changed if a signal from the neighboring base station is larger than the preset reception level and the reception level difference is larger than the threshold value level.

Through these operations, the exchange office can immediately confirm the location of the mobile terminal C and properly conduct location control.

In addition, also in an area where the reception level difference is nearly zero, change of location registration is not done. When the reception level difference has exceeded the threshold value level location registration is changed. So, the number of changes of location registration can be reduced, resulting to avoid confusion in location control of the mobile terminal.

Next, a second embodiment is explained.

The second embodiment is a case that three radio zones partially overlap.

Figure 5:
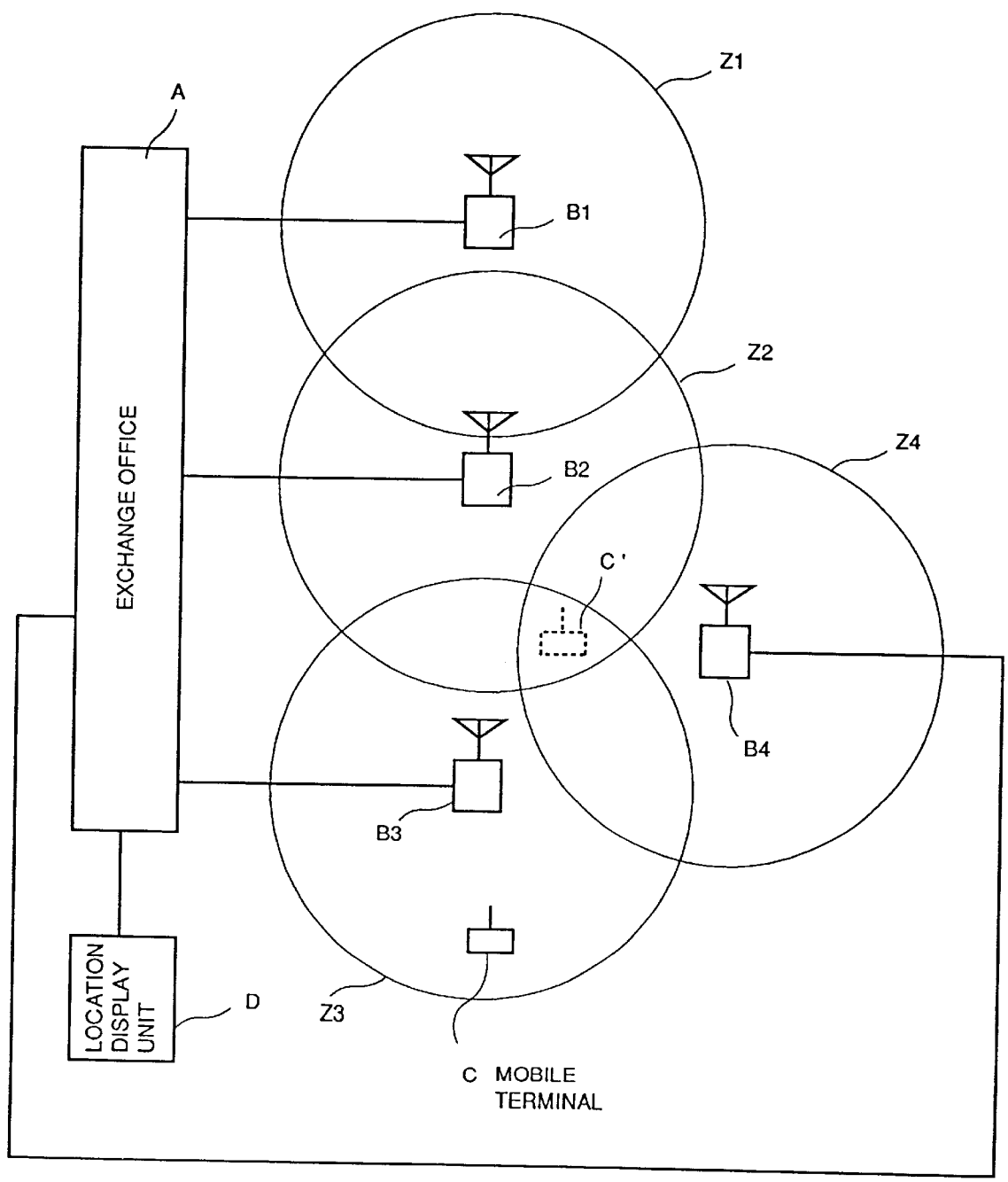
FIG. 5 illustrates a system configuration of a second embodiment.
Figure 6:
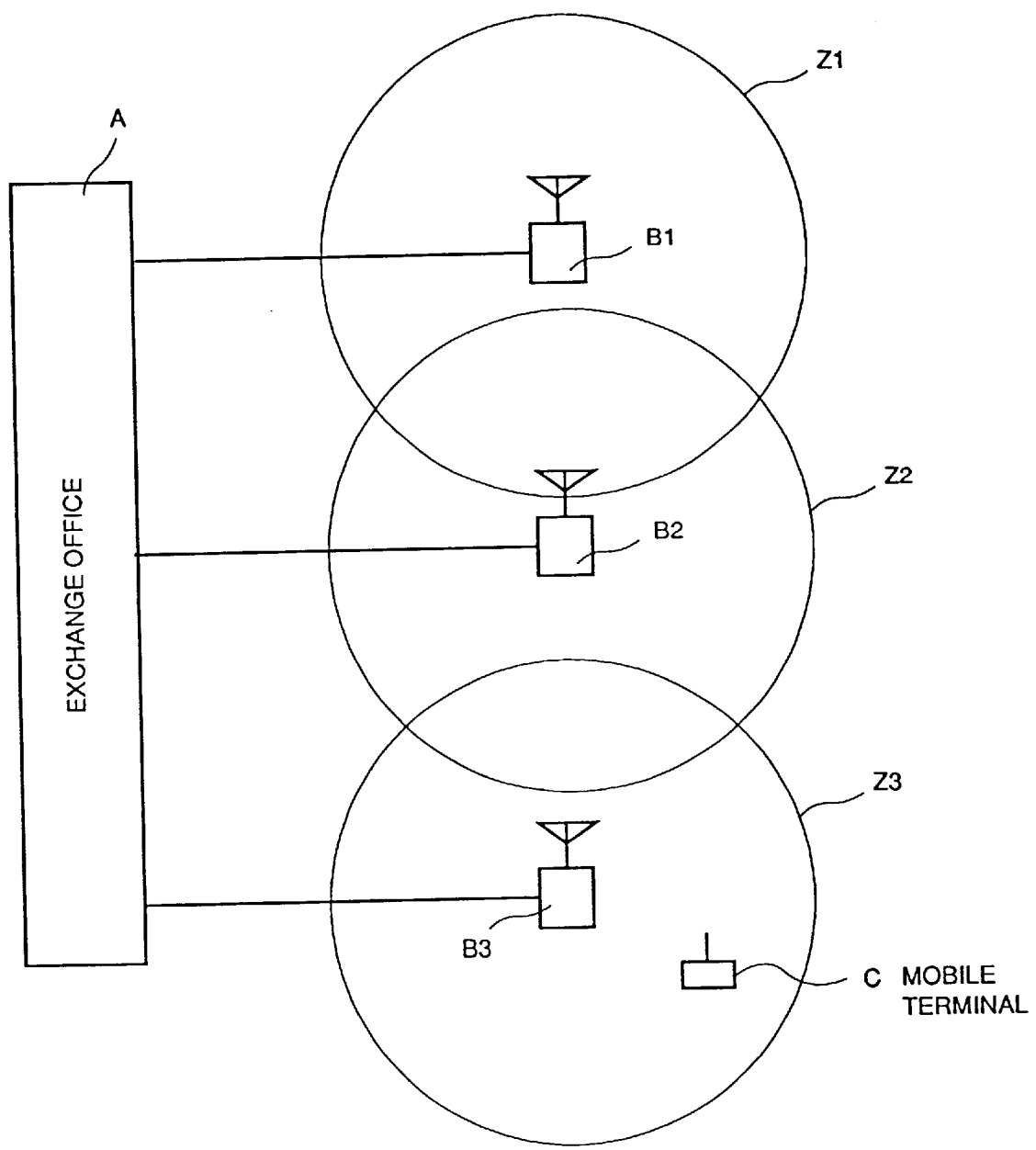
FIG. 6 is a figure for explaining a prior art.
Figure 7:
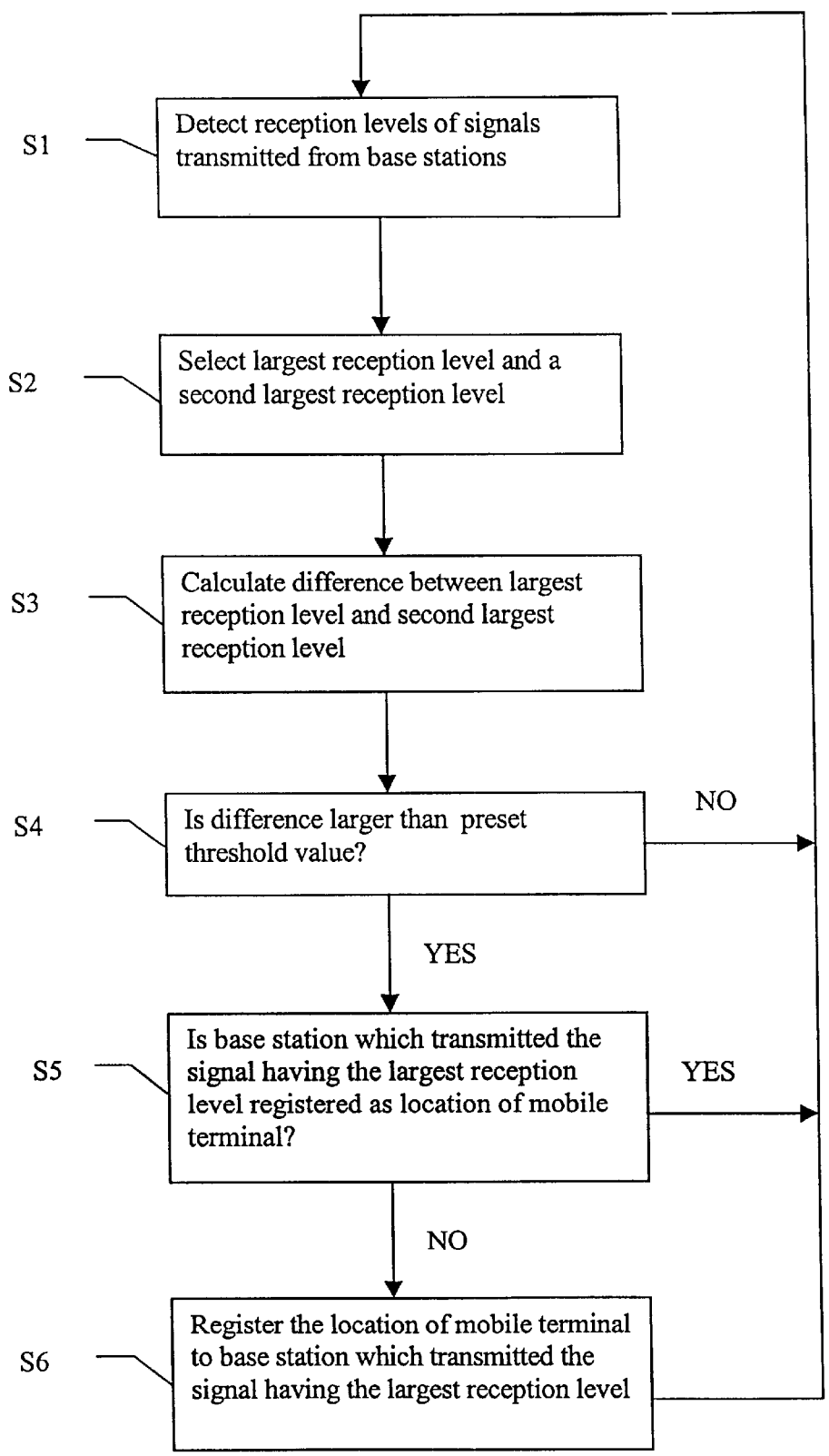
FIG. 7 is a flowchart illustrating a location registration method in accordance with the second embodiment of the present invention.

FIG. 5 illustrates a system configuration and FIG. 7 illustrates a method flowchart to explain the second embodiment of the present invention.

In this system, the base station B4 making a radio zone Z4 is added to the first embodiment shown by FIG. 1, and the three radio zones Z2, Z3 and Z4 partially overlap.

The base station B4 is connected with the exchange office A, can transmit/receive a signal to/from the exchange office A. Also, a division of the base station B4 is added on the location display unit D in the exchange office A.

In this second embodiment, a mobile terminal receives three signals from three base stations in an area where three radio zones z2, z3, and z4 partially overlap. Therefore, the level detection section 2 detects reception levels of the three signals from the respective base stations (step S1), and selects and outputs a largest reception level and a second largest reception level to the calculation section 3 (step S2). In addition, the level detection section 2 generates identification information indicating a base station that transmits the largest reception level signal. The other components are the same as those of the first embodiment. Namely, the calculation section 3 calculates a difference between the largest reception level and the second largest reception level (step S3). The comparison section 5 compares the reception level difference to a preset threshold value (step S4). If the reception level difference is greater than the preset threshold value, a location registration signal is output to the base setting section 7 which compares a base station indicated by an identifier stored in the memory 6 and a base station indicated by the identification information (step S5). If the base station indicated by the identifier stored in the memory 6 is the different from the base station indicated by the identification information, the base station setting section 7 registers the location of the mobile terminal to the base station indicated by the identification information (step S6).

Next, operations of the second embodiment are explained. The threshold value that is set in the threshold value setting section 4 is assumed as 5 dB.

[Case-1]

The mobile terminal C is in the zone Z3 of the base station B3. (In this case, the mobile terminal C is shown by a solid line in FIG. 5)

Here, the case that the mobile terminal C is in the zone Z3 of the base station B3, the mobile terminal C can receive a signal from the base station B3 but can not receive any signals from other base stations is explained.

In this case, only the signal from the base station B3 is received, so the largest reception level is a reception level from the base station B3. The other reception levels are 0 dB.

Accordingly, the level detection section 2 detects a reception level of signal from the base station B3, generates and outputs identification information indicating the base station B3.

After these operations, the system operates similarly to the Case-1 of the first embodiment.

[Case-2]

The mobile terminal C is in an area where the radio zones Z2, Z3 and Z4 partially overlap each other. (In this case, the mobile terminal C' is shown by a broken line in FIG. 5)

It is assumed that the mobile terminal C moves from the radio zone Z3, which does not overlap with any radio zones, of the base station B3 to which the mobile terminal C registers its location to an area where the radio zones Z2, Z3 and Z4 partially overlap each other.

In this case, the mobile terminal C receives a signal from the base station B3 to which the mobile terminal C registers its location and signals from neighboring base stations B2 and B4.

The level detection section 2 detects reception levels of signals from respective base stations.

Here, it is assumed that the reception levels of signals from the base stations B2, B3 and B4 are 2 dB, 5 dB and 1 dB, respectively.

Then, the level detection section 2 selects the largest reception level 5 dB and the second largest level 2 dB. The signal of the largest reception level 5 dB is a signal from the base station B3, so identification information indicating the base station B3 is generated.

Continuously, the calculation section 3 calculates a difference of both reception levels. The reception level difference is 3 dB.

The comparison section 5 compares the reception level difference 3 dB and the threshold value 5 dB. In this case, the threshold value is larger than the reception level difference. Therefore, a location registration requirement signal is not output.

The base station setting section 7 does not receive any location registration requirement signal, so it does not conduct location registration.

When the mobile terminal comes close to B2, the reception level of signal from the base station B2 becomes larger and the difference between reception levels of base stations B2 and B3 becomes zero. Accordingly, the level difference output from the calculation section 3 becomes smaller than the threshold value level. At this time, described as above, the comparison section 5 does not output a location registration requirement signal to the base station setting section 7, so base station setting is not changed. The location registration is kept as it is.

When the mobile terminal C moves nearer to the base station B2 than the base station B3, the reception level of signal from the base station B2 becomes larger than that from the base station B3.

Here, it is assumed that the level detection section 2 detects reception levels of signals 2 dB, 8 dB and 1 dB from the base stations B3, B2 and B4, respectively.

Then, the level detection section 2 selects the largest reception level 8 dB and the second largest reception level 2 dB, and generates identification information indicating the base station B2.

The calculation section 3 calculates a difference of both reception levels. The reception level difference is 6 dB.

The comparison section 5 compares the reception level difference 6 dB and the threshold value 5 dB. In this case, the reception level difference is larger than the threshold value. Therefore, a location registration requirement signal is output.

When receiving the location registration requirement signal, the base station setting section 7 compares a base station indicated by an identifier stored in the memory 6 and a base station indicated by identification information. Here, the base station indicated by the identifier stored in the memory 6 is the base station B3, the base station indicated by the identification information is the base station B2. The compared base stations are not the same, so the base station setting section 7 registers location of the mobile terminal to the base station B2.

As a result of this location registration, the mobile terminal C is displayed in the division of the base station B2 on the map of the location display unit D in the exchange office A, so the exchange office can confirm that the mobile terminal C is near the base station B2.

Like this, even if there are three or more neighboring base stations and overlapped radio zones and reception levels of signals from them are the same level, change of location registration is not done through operations including calculation of a reception level difference of the largest reception level and the second largest reception level. When the reception level difference has exceeded a preset threshold value level, location registration is changed.

Accordingly, the number of changes of location registration can be reduced, resulting to avoid confusion in location control of the mobile terminal.

What is claimed is:

1. A mobile communication system comprising:

a plurality of base stations, each of said base stations forming a radio zone;

a mobile terminal that moves in said radio zones and registers a location of said mobile terminal to one of said base stations, wherein said mobile terminal comprises location registration means for detecting reception levels of a plurality of different signals from said base stations, calculating a difference between a first one of said signals transmitted from a first one of said base stations having a largest reception level and a second one of said signals transmitted from a second one of said base stations having a second largest reception level and registering the location of said mobile terminal to said first base station having transmitted said first one of said signals having said largest reception level when said difference is larger than a preset threshold value; and an exchange office connected with said base stations and for receiving location information of said mobile terminal via a base station to which the location of said mobile terminal has been registered and confirming the location of said mobile terminal, wherein said exchange office comprises location display means having a map indicating divisions of said base stations and for displaying the location of said mobile terminal in one of said divisions of said base stations based on a signal from said base station to which the location of said mobile terminal has been registered.

2. A mobile communication system comprising:

a plurality of base stations, each of said base stations forming a radio zone;

a mobile terminal that moves in said radio zones and registers a location of said mobile terminal to one of said base stations, wherein said mobile terminal comprises location registration means for detecting reception levels of signals transmitted from two of said base stations, calculating a difference between the reception levels and registering the location of said mobile terminal to one of said two base stations having transmitted a signal having a larger reception level when said difference is larger than a preset threshold value; and an exchange office connected with said plurality of base stations and receiving location information of said mobile terminal via a base station to which the location of said mobile terminal has been registered and confirming location of said mobile terminal, wherein said exchange office comprises location display means having a map indicating divisions of said base stations and for displaying location of said mobile terminal in one of said divisions of said base stations according to a signal from said base station to which said location of said mobile terminal has been registered.

3. A method for registering a location of a mobile terminal in a mobile communication system comprising a plurality of base stations, each of said base stations makes a radio zone, and a mobile terminal that moves in a plurality of radio zones, in said mobile terminal, the method comprising steps of:

detecting a plurality of reception levels of a plurality of different signals transmitted from said base stations;

selecting a largest reception level and a second largest reception level from among detected reception levels;

calculating a difference between said largest reception level and said second largest reception level; and registering the location of said mobile terminal to one of said base stations having transmitted a signal having said largest reception level when said difference is larger than a preset threshold value, wherein said step of registering the location further comprises steps of:

confirming whether the location of said mobile terminal has been registered to said base station having transmitted said signal having said largest reception level; and registering the location of said mobile terminal to said base station having transmitted said signal having said largest transmitted level when location of said mobile terminal has not been registered to said base station having transmitted said signal having said largest transmitted level.

* * * * *